INVENTORS
Alan L. Hitzelberger, &
Kenneth G. Leslie

Paul Fitzpatrick
ATTORNEY

United States Patent Office 3,371,698
Patented Mar. 5, 1968

3,371,698
ISOCHRONOUS GOVERNOR
Alan L. Hitzelberger, Grand Blanc, and Kenneth G. Leslie, Fenton, Mich., assignors to General Motors Corporation, Detroit, Mich., a corporation of Delaware
Filed July 26, 1965, Ser. No. 474,559
14 Claims. (Cl. 158—36.4)

ABSTRACT OF THE DISCLOSURE

A fuel control for a gas turbine including means to correct fuel flow to provide isochronous operation. In normal governing operation, the fuel flow is controlled by a governor valve responsive to engine speed across which the pressure drop is maintained constant. Since the valve opening is a direct function of speed, the flow through the valve is a predetermined value at the isochronous speed. This flow may be measured directly, but preferably the pressure drop across the valve is used as a measure of flow to control valve means supplementing the fuel flow to the engine. This supplemental fuel control may integrate the speed error or may have a valve responsive both proportionally and integrally to the fuel flow through the governor. Pressure drop across the governor valve may be balanced against a fuel limiting valve open in steady-state operation or against an orifice provided for the purpose.

---

Our invention is directed to engine controls and to isochronous governing devices. In its preferred form the invention is embodied in isochronous governing controls for gas turbine engines.

Most gas turbine fuel controls embody governors which control the supply of fuel to the engine in steady state operation, as well as other fuel regulating means to control fuel during acceleration of the engine. Usually, the governors are of the proportional or droop type, with the result that engine speed varies with changes in load. If the governor has very close speed regulation, the system is likely to be unstable. Isochronous governors for gas turbines are needed for some uses, and some have been proposed. Our invention involves what we believe to be a new approach to the provision of isochronous control having advantages in simplicity, economy, and reliability.

By way of introduction, the basic idea underlying the several forms of the governor which we have conceived involves using the flow of fuel or other motive substance through a governor valve as a means to indicate the degree of opening of the valve. This is possible if the pressure head across the valve is controlled. When such a governor valve with constant head is operated by a speed responsive device, the amount of flow reflects the opening of the valve which in turn indicates the position of the speed responsive device, which is determined by engine speed. We have devised several systems in which flow through an additional metering valve is integrated in one way or another to correct the fuel flow to the engine to bring it on speed. The normal proportional governor gives stable control of the engine with changes in load and the integrating device corrects the fuel flow to bring the engine back to normal full speed operation.

The nature of the invention and its advantages will be apparent to those skilled in the art from the accompanying drawings of preferred embodiments of our invention and the succeeding description thereof.

Figure 1:
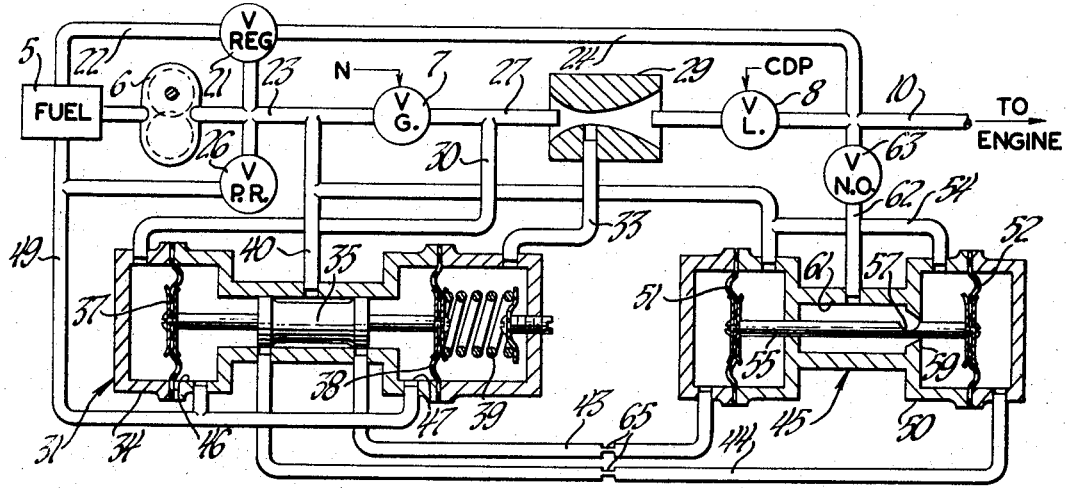
FIGURE 1 is a schematic diagram of a gas turbine fuel control embodying our invention.

The basic fuel supply and control system with which our invention is incorporated is of well-known type and has been described, for example, in Flanigan et al. U.S. Patent No. 2,976,683. Referring to FIGURE 1, fuel from any source 5 is delivered by a pump 6, which may be driven by the engine, through a governor valve 7 and a flow limiting valve 8 to a fuel delivery line 10 leading to the engine. The governor valve is controlled by engine speed responsive means and the limiting valve by means responsive to compressor discharge pressure, as indicated schematically in FIGURE 1.

Figure 2:
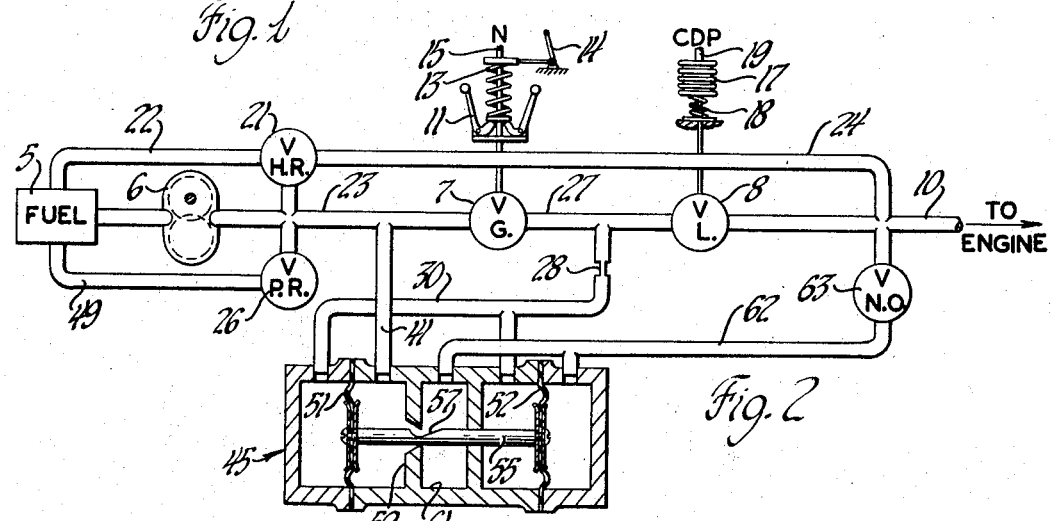
FIGURE 2 is a schematic diagram of a gas turbine fuel control including a different form of our invention.

Such means are shown more graphically in FIGURE 2 in which the elements previously described are given the same numbers as FIGURE 1. As illustrated in FIGURE 2, valve 7 is operated by a speed responsive flyball device 11 which has a speeder spring 13 adjustably loaded by a control lever 14 and which is driven through a shaft 15 by the engine. The limiting valve 8 is operated by a bellows 17 working against a spring 18, the bellows being connected to the compressor outlet by the line 19. The opening of valve 8 is thus maintained generally proportional to compressor discharge pressure. Normally, the valve 8 determines the amount of fuel supplied to the engine when it is accelerating, but the fuel for steady state running is determined by the governor valve 7.

The pressure drop across the fuel metering means, that is, the valves 7 and 8, is maintained constant by a pressure regulating valve 21 which controls flow through a bypass line 22 from the pump outlet back to the source 5. This valve is controlled by the difference between pump outlet pressure in the line or manifold 23 and metered fuel pressure in line 24 branching from the delivery line 10. A pump pressure relief valve 26 may also be provided. A conduit 27 connects the outlet of the governor valve to the inlet of the limiting valve and the outlet of the latter is connected to the engine. A flow meter 29 of the venturi type is interposed in line 27. Pressure upstream of the venturi is transmitted from line 27 through a branch line 30 to a speed error detector 31. The pressure in the venturi throat is transmitted through a line 33 to this speed error detector. As will be seen, this device embodies a housing 34 in which is mounted a pilot valve spool 35 connected for operation by two diaphragms 37 and 38 of equal area. The governor outlet fuel pressure in line 30 biases diaphragm 37 to the right, as illustrated, and venturi throat pressure biases diaphragm 38 to the left, as illustrated. An adjustable compression spring 39 also biases the valve spool to the left.

The valve spool 35 controls flow of pump discharge fuel, used as servo fluid, from a branch 40 of line 23 to two conduits 43 and 44 leading to an integrator 45. The valve spool is shown in neutral position in which flow is cut off from the lines 43 and 44. Movement of the valve will supply pump discharge fuel to one of the lines and allow fluid to flow from the other line into either of chambers 46 and 47 at the ends of the valve, which chambers are connected through a return line 49 to the fuel source 5. It will be noted this connection maintains a balance of the pressures on the inner sides of the diaphragms 37 and 38. When the flow through venturi 29 is such that the pressure differential exerted on the diaphragms balances the setting of spring 39, valve spool 35 is centered. If the flow deviates from this value, valve spool 35 will move in one direction or the other to supply servo fluid to the integrator 45.

The integrator 45 embodies a simple servomechanism supplied by the pilot valve 35, and a speed correcting valve 57 connected in parallel to the previously described fuel metering valves 7 and 8, between the pump 6 and the engine. It includes a body 50 mounting balanced diaphragms 51 and 52. Lines 43 and 44 connect to chambers at the outer faces of the diaphragms. The inner faces of the diaphragms are connected through a branch line 54 to the outlet of pump 6 so that balanced pressure urges the diaphragms apart. A valve stem 55 connects the two diaphragms and serves as a valve spindle. A contoured portion 57 of the stem 55 cooperates with an orifice in a wall 59 of the integrator to define a speed correcting valve. This valve controls fuel flow from the line 54 into chamber 61 and then through a line 62 into line 10 and to the engine. A valve 63 in line 62 is normally open during operation of the engine, but is closed for starting and initial acceleration and for stopping the engine so that the isochronous governing mechanism including the error detector 31 and integrator 45 is disabled under these conditions. Calibrated orifices 65 are fitted in lines 43 and 44 to limit the speed of movement of the valve 57.

The operation of this device should be clear but may be reviewed briefly. As the engine is started, valve 63 is closed. The engine is underspeed, and governor valve 7 is open. Fuel is controlled by valve 8 which limits it in response to compressor discharge pressure. When the engine accelerates to the speed setting of the governor, the governor valve closes to hold the engine substantially on the preset speed and valve 8 is ineffective to control the fuel at this point. Valve 63 is opened. The valve 8 will normally be wide open and thus will be of fixed area. Also, when the engine is on speed, governor valve 7 will be of a predetermined area and thus the pressure drops across valves 7 and 8 are constant, the total drop being that determined by regulating valve 21. The flow through these two valves will therefore be a predetermined value if the engine is on speed. If the engine goes overspeed, the governor valve will close to some extent and if it runs underspeed because of an increase in load, the governor valve will open to some extent. Thus, the total resistance to flow through valves 7 and 8 will depend upon engine speed and, with the constant pressure drop, the flow through line 27 will indicate engine speed. This flow is measured by the venturi 29 and speed error detector 31 to the extent that the detector moves pilot valve 35 from its null position in response to any flow error, and therefore in response to any speed error. Movement of the pilot valve operates the servo diaphragms of integrator 45 to open or close the speed correcting valve 57 to supply more or less fuel to the engine. When the correct amount of fuel to bring the engine to the preset operating speed is supplied, the governor comes back to its normal position, valve 7 is at its normal opening, flow through line 27 is back to normal, and the pilot valve 35 is again brought to null. The supply of fuel through the correcting valve 57 is thus whatever is required to keep the engine on speed and the valve 57 provides isochronous governing as a supplement to the proportional governor valve 7. Valve 63 is again closed when the engine is to be shut down.

It may be noted that the system of FIGURE 1 operates accurately regardless of the relative proportions of valves 7 and 8 as long as the opening of valve 8 is constant during full speed operation or as long as the pressure drop through valve 8 is negligible. The speed correcting isochronous governing part of the mechanism will work if the metering valve 8 is eliminated altogether, since the speed correction depends only upon a measure of flow through the governor valve and it is only necessary for accuracy that this flow not be varied by the valve 8 during governing operation.

FIGURE 2 shows a second and simplified form of control according to the invention in which the flow meter and speed error detector of FIGURE 1 are dispensed with. As illustrated in FIGURE 2, parts corresponding to those in FIGURE 1 have the same numbers. The integrator 45 embodies diaphragms 51 and 52 connected by stem 55 having a contoured portion 57 cooperating with a wall 59 to define a fuel correcting valve. Branch line 41 from the pump supplies pressure fuel to the inner side of diaphragm 51 and to the valve 57. A central chamber 61 is connected through line 62 and normally open valve 63 to the engine supply line 10. A branch line 30 supplied through an orifice 28 from the governed fuel line 27 is connected to the outer side of diaphragm 51 and the inner side of diaphragm 52. Line 62 is connected to the outer side of diaphragm 52. Thus, as illustrated, the difference between pump discharge pressure and pressure downstream of governor valve 7 is exerted on diaphragm 51 urging it to the left in a direction to decrease the flow of speed correcting fuel. Diaphragm 52 is biased to the right as illustrated by the difference between the pressure downstream of valve 7 and the pressure downstream of valve 8, tending to increase fuel. In other words, the valve stem 55 is biased in one direction by the drop across valve 7 and in the other direction by the drop across valve 8.

In the device as illustrated it is assumed that diaphragms 51 and 52 are of equal area and that the effective areas of the governor valve 7 and the limiting valve 8 are equal when the engine is running exactly at rated speed. The valve 8 may be assumed to be fully open under these running conditions. Therefore, if the engine runs over or underspeed, the flyball device 11 will close or open valve 7, unbalancing the drops across the two valves and causing consequent unbalance in the forces on the diaphragms 51 and 52 which will shift valve 57 to correct fuel flow to the engine. Orifice 28 prevents too rapid movements or overshooting by the integrator 45. The ultimate result is that valve 57 is moved to pass enough fuel to return the engine to its rated speed and keep it there until another load change occurs.

Obviously, the valves 7 and 8 may be of different effective areas and thus have different pressure drops at rated speed if the areas of diaphragms 51 and 52 are correspondingly proportioned so that they are in balance at the rated speed.

This system is much simpler than that of FIGURE 1 primarily because of the elimination of the pilot valve and servo and of the flow meter. The system of FIGURE 2 uses pressure drops across the valves as a measure of the setting of the valve 7 rather than direct measurement of flow through the valve.

Figure 3:
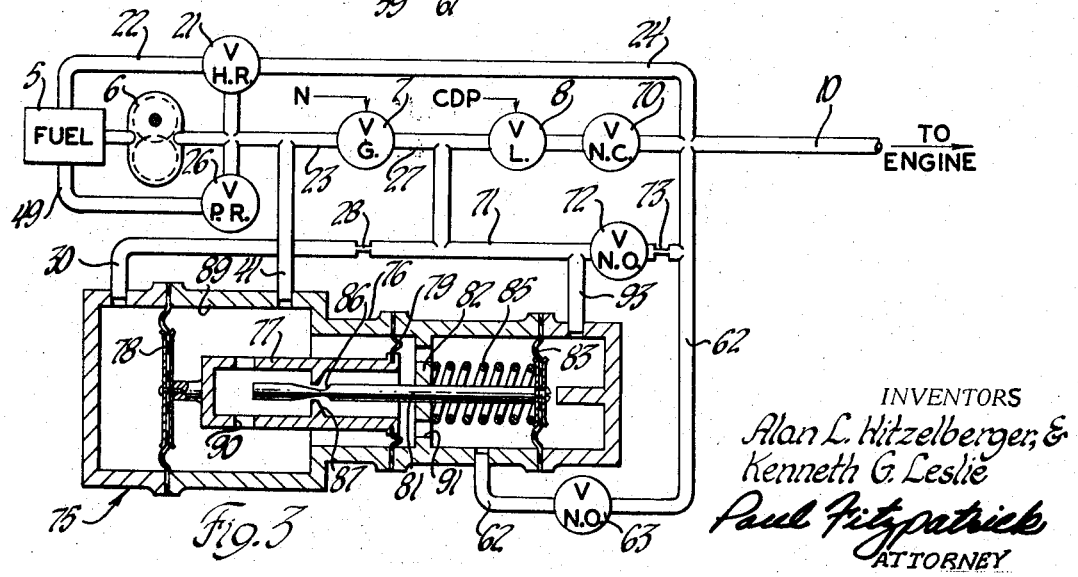
FIGURE 3 is a schematic diagram of a gas turbine fuel control with a still further embodiment.

FIGURE 3 shows a further form of the invention which is slightly more complex than that of FIGURE 2 but which has the advantage of more rapid response to large transients in load than the two previously described forms. The basic fuel pumping and metering circuit comprising the pump 6, governor valve 7, limiting valve 8, and head regulating valve 21 remains as before. A normally closed valve 70 is connected in the circuit immediately downstream of the limiting valve 8. A bypass for the limiting valve is provided through a line 71, a normally open valve 72, and an orifice 73. During starting and acceleration of the engine, valve 70 is energized to open and valve 72 is energized to close so that the fuel is metered by valve 8. Once the engine has been brought up to the normal running speed, the valve actuators are deenergized so that the valve 70 closes and valve 72 opens, and thereby the fuel flow to the engine is diverted through orifice 73 instead of valve 8. Orifice 73 is calibrated to produce the same pressure drop as that of governor valve 7 when the latter is in the position corresponding to rated engine speed.

This form of the invention embodies a different type of integrator valve 75 which has two movable valve members. Integrator valve 75 includes a housing 76 and a movable valve body 77 suspended by and moved axially by two diaphragms 78 and 79. It also embodies a valve stem 81 slidable in a wall 82 in the housing and actuated by a diaphragm 83 acting in opposition to a compression spring 85. A contoured valve portion 86 of the stem 81 cooperates with an opening in the wall 87 of the valve body 77 to define a variable orifice. The pump outlet is connected through a line 41 to the chamber 89 between diaphragms 78 and 79. Fuel may flow from chamber 89 through ports 90 in the valve body, the valve 86, and ports 91 in the wall 82 to the line 62. This line, as in the other forms, is fitted with a normally open valve 63 which is closed during starting of the engine.

The governed fuel line 27 is connected through orifice 28 and line 30 to the chamber at the outer face of diaphragm 78. Governed fuel pressure is also communicated through line 71 and a branch 93 into a chamber on the outer face of diaphragm 83 within the housing 76.

For starting the engine, valves 63 and 72 are closed and valve 70 is opened. Thus, the integrating valve is ineffective. When the engine has been brought to speed, valve 70 is closed and valves 72 and 63 are opened. Fuel flowing through the engine now passes through governor valve 7 and orifice 73 in series. Valve 72 may be assumed to provide no resistance to flow, or orifice 73 and valve 72 may be so proportioned that the pressure drop through these equals the pressure drop through governor valve 7 at normal speed. This being the case, the pressure drop from line 41 to lines 30 and 93 entering the valve, which is the drop across the governor valve, will equal the drop from line 93 to line 62 which is the drop across orifice 73. The effective area of diaphragm 78 is twice that of diaphragm 79 (including valve body 77). Assuming then that the area of 78 is 2A and of 79 is A, it will be seen that the force on diaphragm 78 equals 2A times the pressure drop through valve 7, acting to the left, as illustrated. The force on diaphragm 79 is equal to A times the sum of the drops through the governor valve and orifice 73. Since the sum of the drops is twice the governor valve drop, the net force exerted on body 77 will be zero as long as the engine is on speed. If it overspeeds, the governor valve closes and the drop across diaphragm 78 increases relatively, moving body 77 to the left, thus reducing the fuel flow past valve 86 and correcting for the droop of the governor. Thus the valve body 77 moves with respect to the contoured stem 81 to effect isochronous control.

Considering now the movements of valve stem 81, the position of this stem will be a linear function of the pressure drop across orifice 73 since this pressure drop is acting on diaphragm 83 against the resistance of spring 85. Thus the position of stem 81 is a direct function of fuel flow through the governor valve 7 and stem 81 follows the motion of the governor valve 7. The contour of the valve portion 86 of the stem preferably is such that changes in flow through the valve 86 responsive to movements of diaphragm 83 are proportional to the changes of flow through governor valve 7 which give rise to the movement of stem 81.

This combination of proportional and integrating features in the valve mechanism 75 gives significant advantages over the previously described forms of the invention. This will be clear from the fact that the governor valve, while the control system is in a condition of rest, always delivers the same amount of fuel. Thus, at minimum load the integrator valve passes very little fuel, but at heavy loads it passes a relatively large part of the fuel consumed by the engine. Now, if the engine is operating under heavy load and the load suddenly decreases to a small value or is abruptly cut off altogether, the integrator valve in FIGURES 1 and 2 may not move quickly enough to prevent a large overshoot in turbine speed. The reason for this is that this valve must be damped to provide for stable action under ordinary operation as by the orifices 65 in FIGURE 1 and 28 in FIGURE 2. In the device of FIGURE 3, the line 30 by which pressure is supplied contains restriction 28 which damps the integrating action. However, the movement of stem 81 is not damped and it follows immediately any movement of the governor valve. Thus, when the load is drastically dropped or cut and the engine starts to overspeed, the governor valve will close under action of the flyweights and the resulting drop in fuel flow through that valve and orifice 73 will decrease the pressure difference on diaphragm 83. As a result, stem 81 will move rapidly, to the right as shown, to decrease the fuel flow through the valve generally proportionally to the decrease through the governor valve. After such an excursion of load the body 77 will move with its integrating action to correct the deviation of speed due to the proportionality of the governor.

The device of FIGURE 3 with relatively simple structure provides both a proportional follow-up and an integrating action in the valve assembly 75.

It is apparent that the feature of FIGURE 3 by which an orifice 73 is put into circuit in place of the limiting valve 8 may readily be incorporated in the other forms of the invention. In FIGURES 1 and 2, valve means may be provided to bypass valve 8 and pass the flow from the governor through a calibrated orifice.

With respect to all of the forms of the invention described, it will be understood that any of the orifices may be adjustable for purposes of setting or calibration of the controls if desired. The references to normally open and normally closed valves refer specifically to valves having a solenoid actuator, in which case a normally open valve is closed by energization of the actuator and a normally closed valve is opened when the actuator is energized. Obviously, any shutoff valve operable in any desired manner may be used as valve 63, 70, or 72.

It will be seen that while the several forms of the invention described have different features and different advantages, various ones might be preferred in particular environments. They all have in common the inclusion of isochronous governing with simple mechanism based upon use of fuel flow through a governing valve as a measure of engine speed.

The description of the preferred embodiments of the invention for the purpose of explaining the principles thereof is not to be considered as limiting the invention, since various modifications may be made by the exercise of skill in the art.

We claim:

1. A fuel control system for a gas turbine engine comprising, in combination,
    an inlet for fuel under pressure,
    an outlet for fuel discharged to the engine,
    a governor-controlled fuel regulating valve,
    a fuel limiting valve connected in series with the regulating valve between the inlet and outlet,
    a fixed orifice connected in series with the regulating valve and in parallel with the limiting valve,
    means maintaining a constant pressure drop from the inlet to the outlet,
    means responsive to a condition indicative of flow through the regulating valve as an indication of engine speed operative to supply supplemental fuel to the engine to maintain flow through the governor valve constant and thus maintain isochronous operation of the engine, and
    means for causing the fuel to flow alternatively through the limiting valve or the fixed orifice.

2. A fuel control and governing system for a gas turbine engine comprising, in combination,
    means for supplying fuel under pressure,
    means for delivering the fuel to the engine,
    a governor valve adapted to control flow between the said means,
    means defining an orifice of constant area in normal constant-speed operation of the engine interposed in series with the governor valve between the aforesaid means,
    means responsive to engine speed controlling the governor valve,
    head regulating means maintaining a constant head across the governor valve and the said orifice,
    speed correcting valve means connected in parallel with the governor valve and orifice between the fuel supply and delivering means, and
    speed integrating means responsive to flow through the governor valve and thereby to engine speed connected to control the speed correcting valve means so as to maintain isochronous control of the engine.

3. A fuel control system for a gas turbine engine comprising, in combination,
an inlet for fuel under pressure,
an outlet for fuel discharged to the engine,
a governor-controlled fuel regulating valve,
an orifice normally fixed during full-speed running of the engine connected in series with the regulating valve,
means maintaining a constant pressure drop across the said regulating valve and orifice from the inlet to the outlet, and
valve means responsive to a condition indicative of flow through the regulating valve as an indication of engine speed for variably supplementing fuel flow to the engine to maintain isochronous operation,
the valve means comprising two movable members coacting to define a fuel metering valve varied by movement of either of the members,
means responding to pressure drop across the orifice to set one said movable member to a position which is a direct function of fuel flow through the regulating valve, and
means responding to the differential of the pressure drops across the regulating valve and orifice to move the other said movable member to a position to balance the said pressure drops.

4. A fuel control and governing system for a gas turbine engine comprising, in combination,
means for supplying fuel under pressure,
means for delivering the fuel to the engine,
a governor valve adapted to control flow between the said means,
an orifice normally fixed during full-speed running of the engine interposed in series with the governor valve between the said means,
means responsive to engine speed controlling the governor valve,
head regulating means maintaining a constant head across the governor valve and the said orifice, and
speed correcting valve means connected in parallel with the governor valve and orifice between the fuel supply and delivering means,
the valve means comprising two movable members coacting to define a fuel metering valve varied by movement of either of the members,
means responding to pressure drop across the orifice to set one said movable member to a position which is a direct function of fuel flow through the governor valve, and
means responding to the differential of the pressure drops across the governor valve and orifice to move the other said movable member to a position to balance the said pressure drops.

5. A fuel control system for a gas turbine engine comprising, in combination,
an inlet for fuel under pressure,
an outlet for fuel discharged to the engine,
a governor valve and a limiting valve connected in series between the inlet and the outlet,
means responsive to engine speed connected to the governor valve so as to control engine fuel in normal steady-state operation to maintain speed substantially constant,
means responsive to at least one condition indicative of engine fuel tolerance connected to the limiting valve so as to control engine fuel during speed transients,
means maintaining a constant pressure drop across the said governor valve, and
flow-controlling means connected between the inlet and the outlet in parallel with the governor valve, responsive to a condition indicative of flow through the governor valve as an indication of engine speed, operative to supply supplemental fuel to the engine to maintain flow through the governor valve constant and thus maintain isochronous operation of the engine.

6. A system as recited in claim 5 in which the last-recited means includes a flow meter to measure flow through the governor valve.

7. A system as recited in claim 5 in which the last-recited means responds to the pressure drop across the governor valve.

8. A system as recited in claim 5 in which the isochronizing means includes
a first control device having immediate response adapted to adjust the supplemental fuel flow proportionally to governor valve flow and
a second control device having an integrating response adapted to further correct the supplemental fuel flow to maintain constant flow through the governor valve.

9. A fuel control system for a gas turbine engine comprising, in combination,
an inlet for fuel under pressure,
an outlet for fuel discharged to the engine,
a governor valve and a limiting valve connected in series between the inlet and the outlet,
means responsive to engine speed connected to the governor valve so as to control engine fuel in normal steady-state operation to maintain speed substantially constant,
means responsive to at least one condition indicative of engine fuel tolerance connected to the limiting valve so as to control engine fuel during speed transients and to maintain a constant fixed area of the limiting valve during steady-state operation,
means maintaining a constant pressure drop across the said governor and limiting valves from the inlet to the outlet, and
flow-controlling means connected between the inlet and the outlet in parallel with the said valves, responsive to relative pressure drops across the governor valve and the limiting valve as an indication of engine speed, operative to supply supplemental fuel to the engine to maintain flow through the governor valve constant and thus maintain isochronous operation of the engine.

10. A fuel control system for a gas turbine engine comprising, in combination,
an inlet for fuel under pressure,
an outlet for fuel discharged to the engine,
a governor-controlled fuel regulating valve,
an orifice of constant area in normal constant-speed operation of the engine connected in series with the regulating valve between the inlet and the outlet,
means maintaining a constant pressure drop across the governor valve and orifice from the inlet to the outlet, and
flow-controlling means connected between the inlet and the outlet, responsive to a condition indicative of flow through the regulating valve as an indication of engine speed, operative to supply supplemental fuel to the engine to maintain flow through the regulating valve constant and thus maintain isochronous operation of the engine.

11. A system as recited in claim 10 in which the last-recited means responds to the pressure drop across the regulating valve and the orifice.

12. A system as recited in claim 10 in which the flow-controlling means includes
a first control device having immediate response adapted to adjust the supplemental fuel flow proportionally to governor valve flow and a second control device having an integrating response adapted to further correct the supplemental fuel flow to maintain constant flow through the governor valve.

13. A system as defined in claim 10 in which the flow-controlling means includes valve means comprising two movable members coacting to define a fuel metering valve varied by movement of either of the members, means responding to pressure drop across the orifice to set one said movable member to a position which is a direct function of fuel flow through the governor valve, and means responding to the differential of the pressure drops across the governor valve and orifice to move the other said movable member to a position to balance the said pressure drops.

14. A fuel control and governing system for a gas turbine engine comprising, in combination, means for supplying fuel under pressure, means for delivering the fuel to the engine, a governor valve responsive to engine speed adapted to control flow between the said means during normal steady-state operation, a flow limiting valve adapted to control flow between the said means during engine speed transients, the limiting valve being normally fully open, and thus defining a fixed orifice, when the engine is at governed speed, the said valves being connected in series, head regulating means maintaining a constant head across the governor valve and the limiting valve, speed correcting valve means connected in parallel with the governor valve and limiting valve between the fuel supply and delivering means, and speed isochronizing means responsive to flow through the governor valve and thereby to engine speed connected to control the speed correcting valve means so as to maintain isochronous control of the engine.

References Cited

UNITED STATES PATENTS

| | | | |
|---|---|---|---|
| 2,976,683 | 3/1961 | Flanigan et al. | 60—39.28 |
| 3,074,472 | 1/1963 | Williams | 158—36.4 |
| 3,155,165 | 11/1964 | Boyer et al. | 60—39.28 X |

CHARLES J. MYHRE, *Primary Examiner.*

R. A. DUA, *Assistant Examiner.*